United States Patent [19]
Doggett, Jr.

[11] 3,721,978
[45] March 20, 1973

[54] ADAPTIVE RADAR CLUTTER REJECTION

[75] Inventor: John G. Doggett, Jr., Scottsdale, Ariz.

[73] Assignee: Motorola, Inc., Franklin Park, Ill.

[22] Filed: Nov. 19, 1968

[21] Appl. No.: 776,908

[52] U.S. Cl. ..................................343/7 A, 343/7.7
[51] Int. Cl. ..............................................G01s 9/42
[58] Field of Search ...........................343/7 A, 7.7, 8

[56] References Cited

UNITED STATES PATENTS 3,465,336  9/1969  Fishbein et al. ....................343/7.7

Primary Examiner—T. H. Tubbesing
Attorney—Mueller & Aichele

[57] ABSTRACT

A control loop in a radar receiver is jointly responsive to range gated video and a reference potential to establish a filter control signal. A plurality of range gated filters are responsive to the filter control signal to adjust the frequency response in a manner such that clutter is rejected yet the maximum frequency bandwidth is dynamically provided for moving target detection for varying clutter conditions. Each range gated filter has a filter element which is switchable such that the effective electrical properties of the element vary in accordance with the switching to thereby effect a change in the frequency characteristics of the filter. The switching rate is much higher than the pulse repetitive frequency of the radar such that the switching rate does not interfere with signals being processed through the filter. In one embodiment, a variable duty cycle pulse generator having a fixed frequency is utilized to effect control over the frequency characteristics of a filter.

7 Claims, 10 Drawing Figures

TYPICAL RANGE GATED FILTER

INVENTOR.
JOHN G. DOGGETT, JR.
BY
Mueller, Aichele & Rauner
ATTORNEYS

INVENTOR.
JOHN G. DOGGETT, JR.
BY
Mueller, Aichele & Rauner
ATTORNEYS

ADAPTIVE RADAR CLUTTER REJECTION

BACKGROUND OF THE INVENTION

This invention relates to radar systems and more particularly to radar systems which adaptively reject clutter.

In vehicle borne scanning radar systems, the ground clutter return has a Doppler effect in accordance with the speed of the vehicle and the direction of the antenna beam with respect to the direction of movement of the vehicle. Many airborne radar antennae emit energy in the form of a beam having a small angle of divergence causing a finite beam width. This angle is a matter of design choice. In some radar applications the angle of divergence may be large, i.e., the beam is quite wide or even may be omnidirectional. For purposes of simplifying discussion, this discussion is limited to a radar antenna having a small angle of beam divergence. Even so, the intercept of terrain by the radar antenna emitted energy is sufficiently large that the Doppler effect frequency shift in energy reflected toward such radar antenna from the terrian varies across the beam width as will be briefly discussed. This phenomenon is well known.

First assume the radar antenna is forward looking such that the center of the beam lies along the velocity vector of the aircraft carrying the radar system. As a result of the finite width of the emitted beam, the radiation returning to the antenna is reflected from terrain both directly ahead of and to either side of the aircraft. The width of the beam at the intercept of the beam and the terrain is a function of the distance from the antenna to the terrain and the angle of divergence. Since the beam width is finite, the relative velocity between the aircraft and a terrain intercept varies across the width of the beam. This geometric relationship is well known. As a result there is a spread in the Doppler shift of frequency of the reflected energy. Since a single antenna or antenna system receives all the reflected energy within the beam width the terrain reflected energy (clutter) appears across a finite bandwidth of frequencies.

This variation or spread of Doppler shift in frequency of the clutter is broadened when the antenna scans transverse to the direction of aircraft travel and is pointing at an angle $\theta$ with respect to direction of aircraft travel, as the antenna points away from the direction of travel, the interception of terrain by the radiated energy has an increasing velocity differential across the beamwidth in accordance with sine $\theta$ as is well known. This increased differential velocity causes an increase in the frequency spread of the clutter. As the frequency band of the clutter varies, the frequencies at which a moving target may be detected varies, that is a moving target usually is not detectable in the frequency bandwidth of high clutter energy. A moving target, of course, causes a different Doppler shift in reflected energy to cause a reflected signal having some frequencies outside the frequencies containing high clutter energy.

In addition to the above described spreading of Doppler shifted frequencies by a scanning airborne antenna there is a change in frequency shift itself. That is, all reflected energy intercepted by the radar antenna has a change in frequency as the antenna scans from side to side. This change in frequency shifts the band of frequencies of such reflected energy in accordance with cosine of the angle $\theta$. This shift is compensated for in a coherent type of radar adjusting the local oscillator with the changing Doppler shift. In pulse type or noncoherent radar the frequency shifted signals are included in the clutter reference so as not to be detected. In any event, the absolute Doppler shift is accommodated by known techniques. It is desired to improve radar operation by maximizing the frequency bandwidth for moving target detection in accordance with clutter level.

In addition to the Doppler spread referred to above, different terrain objects (trees, water, rock, buildings, and the like) have different radiation reflection characteristics. Therefore, as an aircraft flies over different terrain, the level of reflected energy is subject to change. This effect is somewhat similar to the above described Doppler spreading insofar as moving target detection is concerned. This undesirable change in clutter can be accommodated when the Doppler spreading is accommodated.

It is well known that it is desired to eliminate all clutter returns from the radar processor circuits, and, on the other hand, it is desired to have the maximum frequency bandwidth for moving target detection. Therefore, as the radar antenna in a moving vehicle scans, it is desired to adjust the clutter rejection to accommodate the above described Doppler frequency spreading of clutter. Prior radar systems often had a fixed range gated filter response designed to reject a given clutter. Such an approach may be satisfactory for a constant scan rate fixed location radar but does not maximize moving target detection in a dynamically changing system. Other radar units were provided with operator selection of several clutter rejection characteristics. This selection may be acceptable for a slow changing clutter characteristic. However, in high speed vehicles, especially those with high scan rate radar antennas, the changing clutter returns due to the Doppler effect are not adequately compensated for. Therefore, it is desired to have a variable clutter rejection in a radar receiver which responds to the returned signals in a manner such as to maximize the frequency range for moving target detection as limited by the clutter returns being received. Such an adaptive clutter rejection provides an advantage to vehicle borne radar systems with a scanning antenna. Improved performance of other types of airborne and ground radar systems is also provided by practicing the below described invention.

SUMMARY OF THE INVENTION

It is an object of this invention to provide a simple dynamically self-optimizing clutter rejection system for a radar system.

It is another object of this invention to provide in a radar receiver a maximum frequency bandwidth for moving target detection that is substantially free of clutter in accordance with a predetermined standard of clutter rejection.

It is another object of this invention to provide an electrically alterable frequency response of a filter to accomplish the above stated objects with a minimum of interference with signals being processed.

A feature of the present invention is the utilization of plural range gated filters which are electrically alterable by rapidly switching an electrical device therein between two electrical states such as to change the effective electrical characteristics of such device.

Another feature is the averaging of gated radar video signals within a predetermined range of interest and utilizing the average gated video to adjust the frequency characteristics of range gated filters.

Another feature is a radar system having a predetermined pulse repetitive frequency with clutter returns being typically centered at zero frequency and about multiples of the PRF wherein dynamically varying band of frequencies for moving target detection are provided between the dynamic bounds of the clutter. Such a radar system is responsive to changes in the clutter returns for adjusting the frequency bandwidth of the region for moving target detection.

In one embodiment of the invention, a radar transmitter and receiver is supplied main timing pulses by a radar range gate generating system which also produces plural range gating signals. A plurality of range gated filters, one filter for each range bin, receives video from the radar receiver and processes it to provide range gated video signals to a radar indicator. An adaptive averaging circuit receives the range gated video and averages same over a predetermined range of interest and supplies a signal having an amplitude indicative of a comparison between the range gated video average amplitude and a reference amplitude. The reference amplitude establishes a permissible average clutter amplitude. A signal responsive variable duty cycle generator receives the average comparison and supplies a variable duty cycle signal to the plural range gated filters for adjusting the frequency characteristics thereof such as to vary the frequency bandwidth of an acceptable region for moving target detection.

The control loop in the radar set is responsive to range gated video and such reference amplitude for establishing in plural range gated filters varying frequency characteristics in accordance with comparison of the reference amplitude and the average amplitude of the range gated video. The range gated filters may be actuated only during a predetermined range of interest or over the entire radar maximum range or any portion thereof.

In one version, a high pass filter of the active element type has its frequency characteristics changed by rapidly switching an electrically responsive switch connected across a component to alter the effective electrical characteristics of that component. The switching rate is much higher than the highest frequency of signals being processed through the filter. In one version, the electrical switch has one terminal connected to ground reference potential and another terminal connected to an end of an electrical element remote from ground reference potential which is within the frequency determining portion of the filter. Such an element may be a resistor. In another version, it is a capacitor.

A MOSFET or any other form of field effect device is connected across the feedback resistor in a filter of the active element type for switching between current conductive and nonconductive states such as to alter the frequency characteristics thereof.

The frequency characteristics of a filter may be altered by rapidly switching an electrical switch between current conduction and nonconduction, i.e., between opened and closed circuits as connected across an electrical element forming a portion of the frequency determining part of a filter.

THE DRAWINGS

DETAILED DESCRIPTION OF THE ILLUSTRATIVE EMBODIMENT

Figure 1:
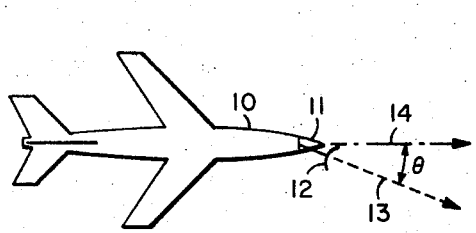
FIG. 1 is a schematic diagram of an aircraft having an airborne radar of the scanning type to illustrate the effect of Doppler on the clutter returns in a radar system.

Referring now more particularly to the drawings, like numbers indicate like parts and structural features in the various diagrams. FIG. 1 illustrates an aircraft 10 having nose radar 11 with a scanning antenna 12 which has a boresight beam 13, for example. As the antenna 12 scans transverse to the direction of flight 14 of aircraft 10 to its maximum side-looking angle $\theta$ indicated by beam 13, the Doppler frequency changes in the beam vary as described in the Background section. If the beam 13 is displaced from the direction of travel 14 by an angle $\theta$, then the Doppler spread of clutter increases to reduce the usable bandwidth for moving target detection. If radar system 11 has a fixed response clutter rejector, then when the antenna 12 is scanned to the side as indicated by beam 13, some clutter returns, which are Doppler shifted, will appear in the region for moving target detection and will then appear on the indicator in the aircraft as moving targets.

Figure 2:
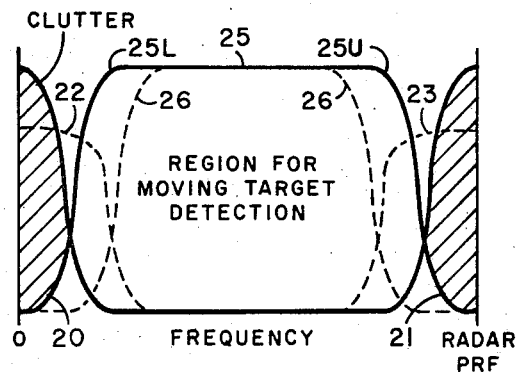
FIG. 2 is a graph illustrating in the frequency domain the effect of variation of clutter on an acceptable region for moving target detection.

The Doppler shifting of clutter is best understood by referring to the frequency domain graph of FIG. 2 illustrating the response of a radar system in the frequency domain. The vertical ordinate represents the amplitude of the frequency components of a received signal. The horizontal ordinate represents the frequency of the radar beam from zero frequency to the pulse repetitive frequency (PRF). In a pulse type radar there are plural frequency spectrums in accordance with the Fourier transformation of the frequencies constituting the repetitive radar pulses. Since this phenomenon is well known and all such higher frequency spectrums are identical insofar as the present invention is concerned, they are not shown. Ground clutter returns are normally at the lower end of the frequency domain as indicated by the hatched area 20. The horizontal width of hatched area 20 is indicative of Doppler spread of fixed targets (ground). Because of the characteristics of pulse radar, symmetrically identical clutter returns appearing at about the integral multiples of the radar PRF and about the PRF are indicated by the hatched area 21. Higher frequency clutter returns are not shown. As the clutter returns represented by hatched area 20 increase in frequency width or spread by the antenna 12 beginning to scan to the side, there is a like increase in frequency width of hatched area 21. These two increases are represented by the two dotted lines 22 and 23, respectively. This characteristic of a radar set is well known and the theory in explaining the behavior thereof will not be delved into for that reason. This variation or Doppler spread of clutter returns are typically at least four or five to one. That is, the movement along the frequency ordinate of the FIG. 2 graph of the hatched areas 20 and 21 varies over a distance ratio of five to one. For a homogeneous terrain, the reflected clutter energy remains constant. Therefore, the areas 20 and 21 are constant. For this reason the height (amplitude) of the clutter is shown as reducing as frequency bandwidth is increased. Changes in terrain reflective characteristics change the reflected energy level which changes the areas 20 and 21.

The acceptable region for moving target detection enclosed by line 25 lies between the two clutter return areas 20 and 21. As the clutter returns increase in frequency bandwidth due to Doppler spread, the region for moving target detection decreases as indicated by dotted line 26. Line 26 corresponds to a maximum allowable region for moving target detection permitted by clutter represented by dotted lines 22 and 23. Correspondingly, as the frequency width or spread of the clutter return decreases, then the region for moving target detection increases.

For optimum detection, i.e., maximizing the possibility of detecting all moving targets, it is desired to keep the region for moving target detection within a radar receiver in a fixed relation to clutter returns as shown in FIG. 2 and described above.

Therefore, a radar receiver should be responsive to clutter returns to adjust the frequency bandwidth of the region for moving target detection. Since, in most radar systems, there is an acceptable clutter level for presentation to the radar indicator, a constant reference can be used to be compared with the average of clutter return for optimizing the region for moving target detection with respect to such clutter returns. To this end, the illustrated embodiment of FIG. 3 is used.

Figure 3:
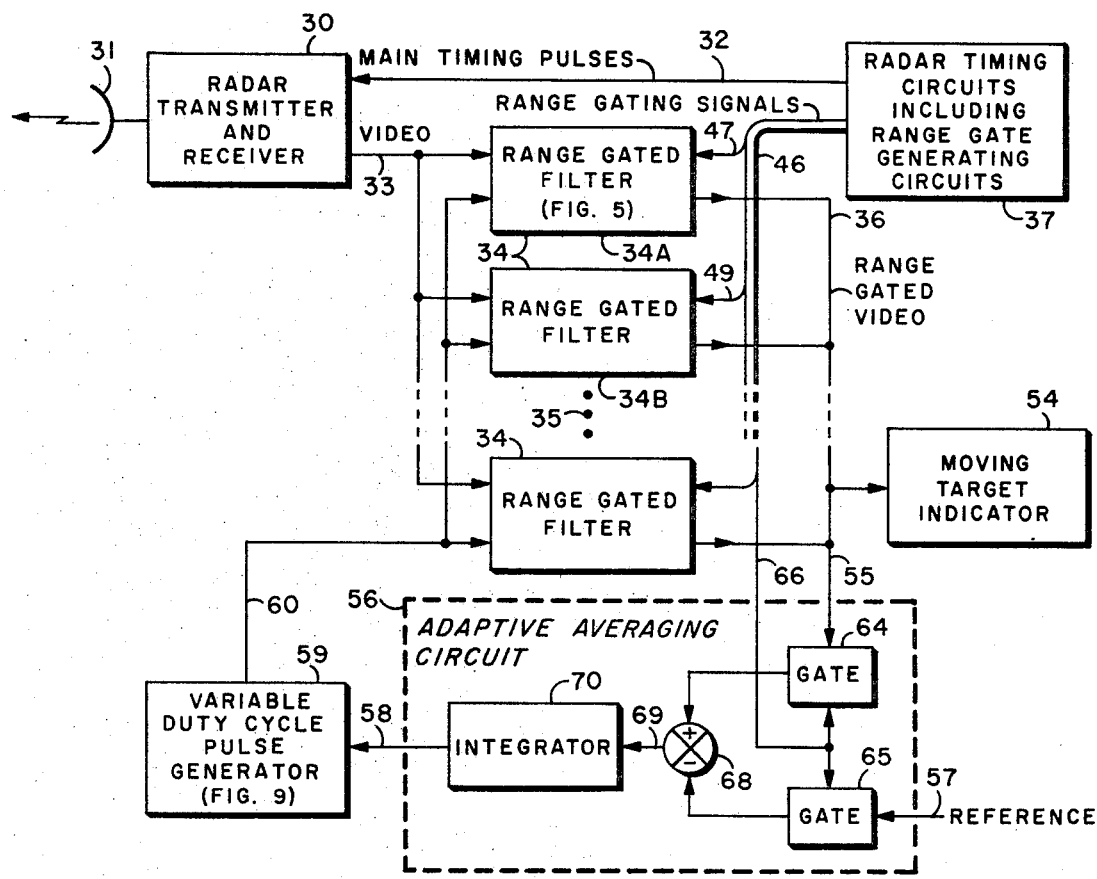
FIG. 3 is a block type signal-flow diagram of a radar system utilizing the present invention.
Figure 4:
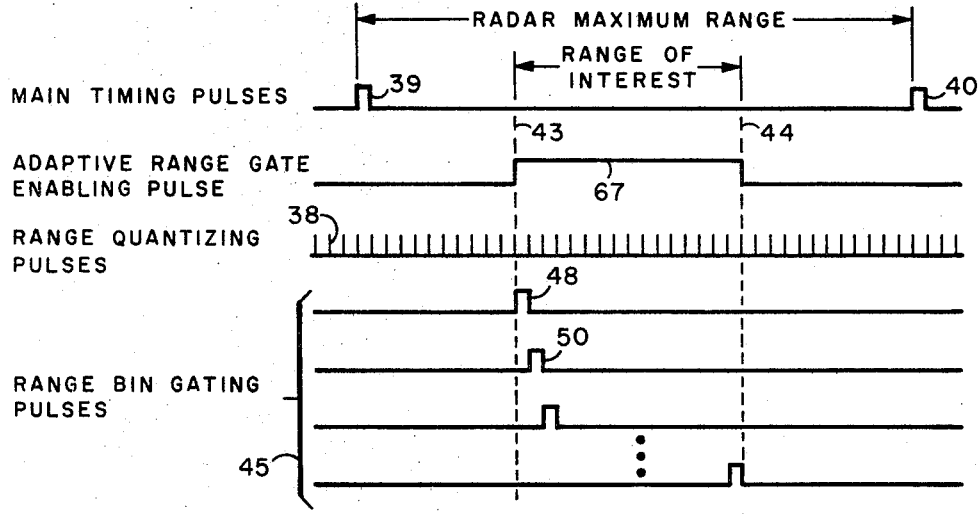
FIG. 4 is a simplified set of idealized signal waveforms utilized to describe the radar system illustrated in FIG. 3.

Shown in FIG. 3, radar transmitter and receiver unit 30 having antenna 31 radiates interrogation or search signals in a fixed time relationship with main timing pulses emitted over line 32. The radiated pulse from antenna 31 is reflected by radar targets in a known manner and the elapsed time from the time of emission to the times of return to antenna 31 is a true indication of the range between the radar antenna and all radar targets. In most instances, there are a plurality of targets at a plurality of ranges. These returns are received by antenna 31 and processed through a receiver and supplied as radar video over line 33 to a plurality of range gated filters 34. Since the number of range gated filters in a given radar set may vary over a wide number, only three are shown with an ellipsis 35 indicating that any number of range gated filters may be utilized in practicing the present invention. Each range gated filter processes video from line 33 to line 36 in differing predetermined time relationships with respect to the main timing pulses on line 32; each given time relationship for the different range gated filters 34 are commonly referred to as range bins. The range gated filter radar timing circuit 37 includes a range gate generator and develops the main timing pulse over line 32 and generates range quantizing pulses 38 (FIG. 4). Although a relatively small number of quantizing pulses are shown in FIG. 4 as occurring in the interval between successive main timing pulses 39 and 40, in practice, a greater number of quantizing pulses 38 will normally be contained in the interval. The purpose of FIG. 4 is to illustrate that the elapsed time between main timing pulses 39 and 40 is divided into a plurality of time periods illustrated as being between successive ones of the range quantizing pulses 38. Each such time period corresponds to a predetermined range of the radar set which are commonly referred to as range bins, i.e., there is one range bin between each two successive pulses 38. The elapsed time between main timing pulses 39 and 40 may correspond to the radar maximum range. In many applications, the maximum radar range may encompass plural timing pulses.

All the returns in a radar maximum range may not be of interest. Therefore, there is arbitrarily shown a range of interest indicated between dotted lines 43 and 44. As shown in FIG. 3, the range gated filters 34 will only pass the radar video on line 33 existing in the time element represented between lines 43 and 44. To this end, radar timing circuits 37 emit a plurality of range gating pulses 45 (FIG. 4) over a cable 46 which has separate signal path connections to all of the range gated filters 34 as will be described with respect to FIG. 5. For the purposes of FIG. 3, it suffices to say that each separate signal path connection in cable 46 supplies a different range gating pulse 45 to the respective filters. For example, line 47 carries range gating pulse 48 (FIG. 4) to the first range gated filter 34A while line 49 carries range gating pulse 50 to the second range gated filter 34B. In a similar manner, each of the range gated filters receive a range gating pulse at different times in order to range gate the video on line 33 into a different range bin. The range gating pulses 45 have a duration equal to elapsed time between two successive range quantizing pulses 38.

The range gating pulses 45 are usually generated by a counter and matrix system (not shown). The quantizing pulses 38 may be generated by a pulse generator synchronized by the main timing pulses such that receiver operation is coordinated with the transmitter operation. Since a radar timing circuit 37 is used in every constructed radar set and can take many variations, such circuit is not further described. It being sufficient to say they are normally used and are utilized to generate range bins.

The range gated video on single line 36 is received from all of the filters 34 and supplied to an MTI (moving target indicator) or other radar indicator, indicated by box 54, as a video signal including returns in all range bins.

To provide adaptive optimizing of clutter rejection, the range gated video on line 36 is also supplied over line 55 to adaptive averaging circuit 56. Adaptive averaging circuit 56 receives a reference potential over line 57 from a source (not shown) as may be manually set by an operator indicative of an acceptable clutter level to indicator 54. Adaptive averaging circuit 56 compares the amplitude of the range gated video over a predetermined period of time, as indicated between lines 43 and 44 of FIG. 4, with the reference potential and supplies a comparison or error signal over line 58. This signal is used to adjust the frequency bandwidth of the region for moving target detection as indicated in FIG. 2.

Variable duty cycle pulse generator 59 which generates a constant frequency is responsive to the line 58 comparison signal to vary the duration of pulses supplied over line 60 to all range gated filters 34 for adjusting the frequency characteristics thereof such that the region for moving target detection is adjusted in frequency bandwidth in accordance with the comparison of the range gated video amplitude and the reference potential on line 57. The frequency of variable duty cycle pulse generator 59 is much higher than the highest frequency processed through range gated filters 34. The purpose of this frequency difference is to eliminate the introduction of spurious signals in the range gated video on line 36 as could appear in indicator 54. While a variable frequency pulse generator could be utilized to give a similar effect, the range of adjustment of the frequency response of the range gated filter is not as great with as simple components and configurations as using a variable duty cycle pulse generator, as will become apparent from the continued reading of the present specification.

Returning now to adaptive averaging circuit 56, the range gated video on line 55 is supplied to a video gate 64, while the reference amplitude on line 57 is supplied to a similar gate 65. Gates 64 and 65 receive a range enabling pulse 67 (FIG. 4) over line 66 of cable 46. Each range enabling pulse 67 has a duration representing the range of interest between lines 43 and 44 (FIG. 4). Therefore, the range gated video on line 55 is utilized in averaging circuit 56 only in such range of interest. Optimization is to clutter in this range only. It is understood that optimal operation may be based on total clutter returns even though the range gated filters 34 sample only a portion of the range. At times outside such portion integrator 70 stores the averaged comparisons in its integrating element.

The range gated video and the reference potential are simultaneously supplied to the comparator 68. The comparator supplies a comparison signal indicative of the difference in signal amplitudes of the video and reference potential over line 69 to integrator 70. Integrator 70 then averages the comparison signals to provide the averaged video signal on line 58 to variable duty cycle generator 59 for adjusting the range gated filter 34 frequency characteristics in accordance therewith.

Figure 5:
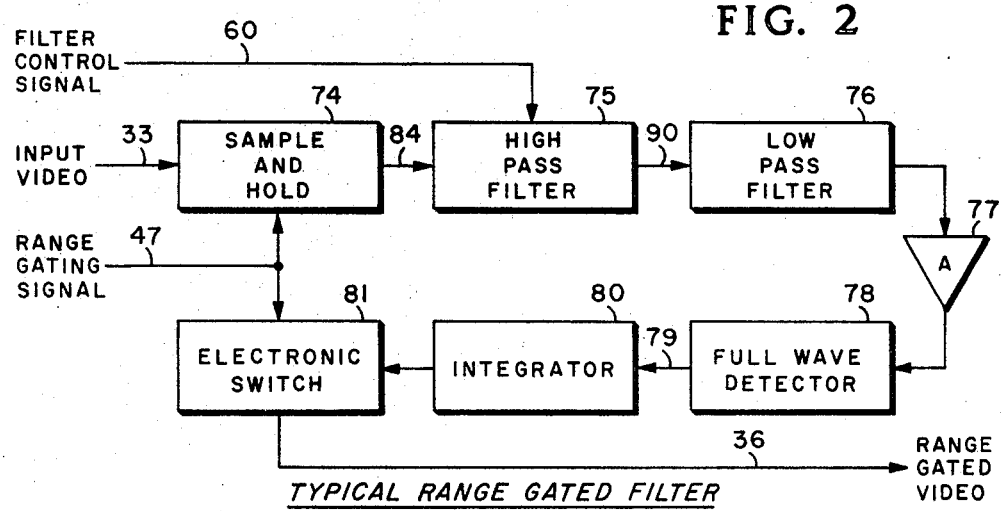
FIG. 5 is a simplified block diagram of a typical range gated filter utilizable with the FIG. 3 illustrated radar system.

Referring next to FIG. 5, a typical range gated filter 34 is illustrated in block diagram form. The input video is supplied first to sample and hold circuit 74 actuated by the range gating pulse 48 on line 47 for the range gated filter 34A. Sample and hold circuit 74 may be of usual design. The sample and held video is then supplied over line 84 through high pass filter 75, thence over line 90 through low pass filter 76 and amplifier 77 to full-wave detector 78. High pass filter 75 defines the lower frequency bound 25L (FIG. 2) and because of the pulse radar frequency characteristics it also determines the upper frequency bound 25U. It is remembered that FIG. 2 only shows the frequencies up to PRF. The detected video is supplied over line 79 to integrator 80 which in turn supplies the integrated video to an electronic switch 81. Switch 81 is actuated by the range gating signal 48 on line 47. When electronic switch 81 is actuated, the gated video is supplied to line 36 only during the period of time corresponding to the range bin defined by the particular range gated filter 34. The variable duty cycle filter control signal on line 60 is supplied in the illustrated filter to high pass filter 75. The filter control signal is utilized to adjust the frequency cut off of the high pass filter 75, i.e., adjusts the lower frequency bound of the frequency pass band represented by line 25L of FIG. 2. As the clutter indicated by the hatched area 20 in FIG. 2 increases in the frequency domain, the low frequency cut off of filter 75 is increased (moved to the right in FIG. 2) for reducing the region of moving target detection. When the clutter indicated by hatched area 20 is reduced in the frequency domain, the low frequency cut off of high pass filter 75 is decreased for increasing the bandwidth of the region of moving target detection.

Figure 6:
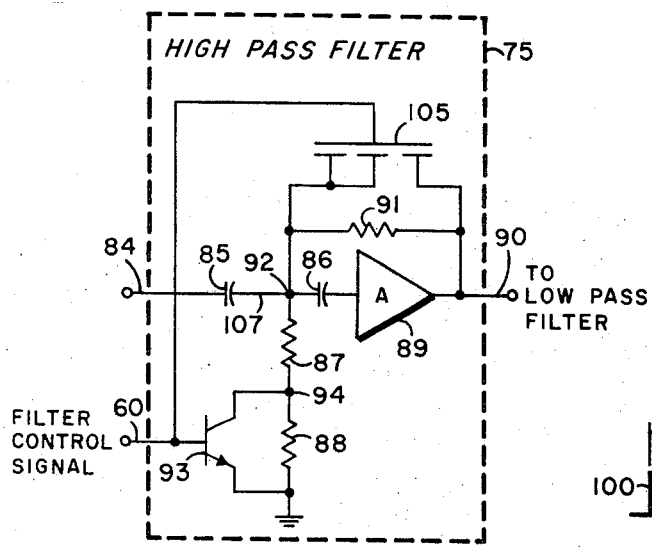
FIG. 6 is a simplified schematic diagram of a highpass filter utilizable with the FIG. 5 illustrated typical range gated filter and showing illustrative connections of various electrically responsive switches utilized to change the frequency characteristics of the filter, i.e., the cut off frequency.

Referring next to FIG. 6, high pass filter 75 is shown in schematic diagram form wherein the sample and held video is received over line 84. An RC network consisting of capacitors 85 and 86 and resistors 87, 88 and 91 are connected for supplying an RC filtered signal to amplifier 89. More than one such filter section may be cascaded to increase the selectivity. The filter controls can be actuated in parallel. Amplifier 89 supplies its signal over line 90 to low pass filter 76 of FIG. 5. It also supplies the output signal through feedback resistor 91 to tie point 92 of the RC input filter. The frequency cut off of high pass filter 75 is adjusted by rapidly switching transistor 93 between current conduction and nonconduction. Transistor 93 is connected in parallel circuit relation to resistor 88. The period of time of conductivity of resistor 93 determines the reduction in the effective electrical impedance from junction 94 to ground reference potential, and thereby changes the RC characteristics of the input circuitry to amplifier 89, hence the cut off frequency. As the transistor 93 is held to current conduction a longer period of time the effective impedance from junction 94 to ground is decreased to thereby increase the frequency cut off. This action corresponds to an increase of clutter spread in the frequency domain. As the transistor 93 is held to current nonconduction for longer periods of time, the effective electrical impedance from junction 94 to ground is increased to thereby decrease the frequency cut off of the filter. This action corresponds to an increase in the frequency bandwidth of the region for moving target detection, resulting from a decreasing clutter spread.

Figure 7:
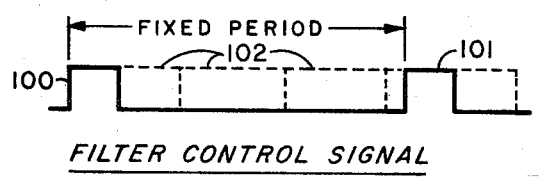
FIG. 7 is a simplified showing of an idealized filter control signal used to control the characteristics of the FIG. 6 illustrated typical range gated filter.

A filter control signal is shown in FIG. 7. It has a fixed period between the leading edges of two successive pulses 100 and 101. As shown in heavy lines, the duration of pulses 100 and 101 are short with respect to this fixed period. This corresponds to transistor 93 being current nonconductive for a major portion of the fixed period thereby indicating there is a small clutter spread in the frequency domain. As the clutter in the frequency domain increases, the duration of the pulses 100 and 101 are increased as indicated by dotted lines 102 to occupy greater and greater portions of the fixed period to thereby decrease the effective impedance between point 94 and ground. As the filter control signal on line 60 is varied in time duration high pass filter 75 of FIG. 6 alters its cut off frequency to thereby change the region for moving target detection in the frequency domain.

The utilization of an electrically responsive switch, such as transistor 93, connected between junction 94 and ground reference potential is desired because the interaction of the switching to filter operation is minimized. It also simplifies circuit construction in that one terminal of the electronic switch is connected to ground reference potential. No limitation to such a connection is intended. It is also shown that line 60 is connected to the field electrode of MOSFET 105. The source and drain electrodes of MOSFET 105 are respectively connected to opposite ends of feedback resistor 91. As MOSFET 105 is switched between current conduction and nonconduction, the effective electrical impedance of feedback resistor 91 is altered in the same manner that the electrical impedance between junction 94 and ground reference potential was altered by the switching of transistor 93. A MOSFET is desired because both terminals of the MOSFET are connected within an active portion of the filter. It is known that a junction transistor would pass a portion of the filter control signal on line 60 to the circuit, i.e., through the base-emitter junction of transistor 93. In MOSFET 105 the field electrode provides very little coupling between line 60 and its current path electrodes, the source and drain. This low coupling minimizes the effect of intermodulation of the high frequency filter control signals with the signals being processed from line 84 to line 90. Other electrically or optically responsive devices may be utilized as switches for adjusting the cut off frequency of high pass filter 75.

Figure 8:
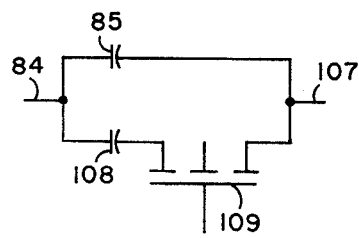
FIG. 8 is a simplified partial schematic diagram of a switching device utilized to vary the effective electrical impedance of a capacitor.

Not only may the resistors, such as resistors 88 and 91, have a switch connected thereacross for altering their electrical impedance, but a capacitor may have its electrical impedance altered as shown in FIG. 8. Capacitor 85 is shown as being connected between lines 84 and 107. A second capacitor 108 is connected in parallel with capacitor 85. A MOSFET 109 is connected in series with capacitor 108 and can be switched between current conduction and nonconduction to selectively connect and disconnect capacitor 108 in parallel circuit relation to capacitor 85 to thereby alter the capacitive impedance of the network. Such alteration obviously changes the filter characteristics of high pass filter 75. Both capacitors 85 and 86 may have their capacitance impedance so changed. While inductances utilized in filters may be so switched, there are additional problems because of the flyback voltages caused in inductances by rapid switching.

Figure 9:
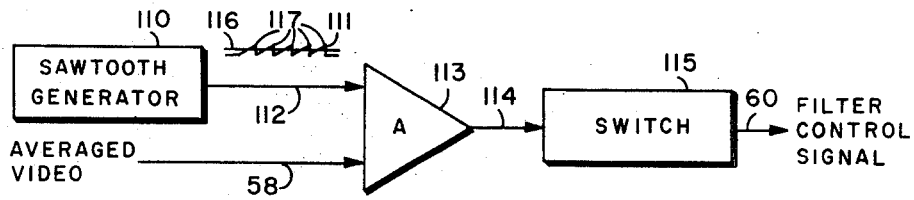
FIG. 9 is a simplified block signal flow diagram of a variable duty cycle pulse generator with an illustrative and idealized ramp signal used to generate varying signal durations.

A circuit suitable for generating filter control signals 100 and 101, (FIG. 7) is illustrated in FIG. 9. A sawtooth generator 110 supplies sawtooth wave 111 over line 112 to differential amplifier 113. The averaged video signal on line 58 is supplied to the reference input of differential amplifier 113. Amplifier 113 supplies the instantaneous difference signal between sawtooth wave 111 and the averaged video on line 58 over line 114 to electronic switch 115. Switch 115 is responsive to the difference signal on line 114 of a predetermined positive amplitude to supply a positive signal over line 60 and further responsive to such difference signal being less positive to supply a negative signal over line 60. Therefore, as the averaged video on line 58 increases in amplitude, there is an indication that there is an increase in clutter spread. Therefore, it is desired to raise the cut off frequency of high pass filter 75. To do this, the time constant, i.e., the electrical impedances, must be decreased. Therefore, if the filter signal on line 60 is positive only when the sawtooth waveform 111 has an amplitude less than the averaged video, an increase in the average video amplitude will increase the period of time, i.e., the durations of pulses 100 and 101. This can be seen by visualizing that when line 116 drawn through waveform 111, is raised toward the peaks 117 that the period of time that the sawtooth waveform 111 has an amplitude less than the line 116 is increased thereby increasing the time that the transistor 93 (FIG. 6) is made current conductive. This action decreases the effective electrical impedance from point 94 to ground reference potential to effect the desired result for reducing the bandwidth of the region for moving target detection. A lowering of line 116, which represents a decrease in amplitude of the averaged video on line 58, causes a corresponding decrease in duration of the filter control signals 100 and 101 to thereby increase the region for moving target detection. Inspection of FIG. 9 shows that if line 116 is raised above peaks 117 switch 115 is in a first continuous signal state corresponding to a duration of pulses 100,101, equalling the pulse period between two successive pulses, i.e., a 100 percent duty cycle. Also, if line 116 is lowered below wave 111, switch 115 is held in a second signal state corresponding to a 0 percent duty cycle.

Figure 10:
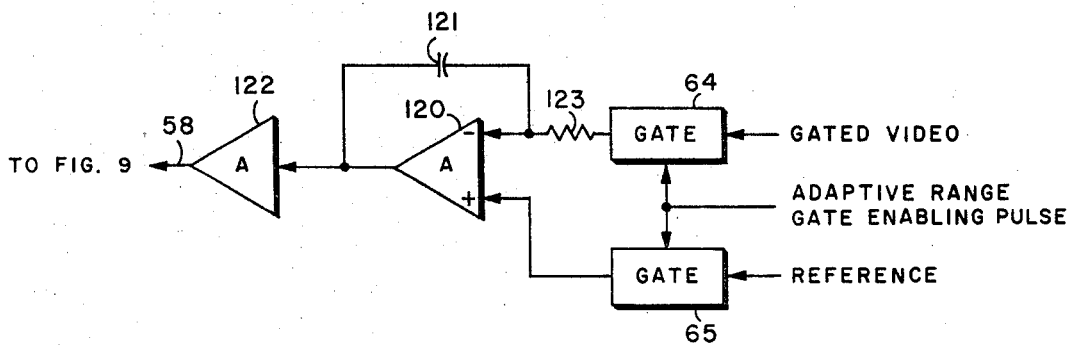
FIG. 10 is a simplified schematic block diagram of a practical adaptive averaging circuit utilizable in the FIG. 3 illustrated radar system.

Referring next to FIG. 10, there is shown a practical embodiment of an adaptive averaging circuit 56. The comparator 68 and the integrator 70 of FIG. 3 are combined into one unit including differential amplifier 120 with resistor 123 and integrating capacitor 121 connected thereacross in a known manner, the video gate 64 output signal is supplied to the inverting input of the differential high gain amplifier 120 while the gate 65 output signal is supplied to the non-inverting input of differential amplifier 120. Differential amplifier 120 then provides a differential comparison of the amplitudes of the two supplied signals and integrates the resultant difference signals. An isolating and inverting amplifier 122 connects the integrator-comparator to line 58 for controlling variable duty cycle pulse generator 59 (FIG. 3). When gates 64 and 65 are closed (not passing signals) capacitor 121 stores the averaged signal amplitude until the next successive gate enabling pulse 67 is received.

I claim:

1. A radar receiver for receiving radar signals subject to Doppler affected clutter, including radar video processing means and timing means for respectively supplying a video signal and a plurality of range gate signals, the improvement including in combination,
a plurality of range gated filters, each range gated filter having frequency variable filter means responsive to a control signal for varying electrical characteristics thereof and each supplying range gated video in joint response to receiving a given range gated signal and said video,
an adaptive averaging circuit receiving said range gated video and comparing same with a reference amplitude and supplying a control signal in accordance with such comparison to said range gated filter means for adjusting the frequency characteristics thereof such that a predetermined relationship exists between the averaged amplitudes of said range gated video and said reference amplitude.

2. The subject matter of claim 1 wherein said radar timing means supplies a range enabling pulse indicative of a radar range of interest,
gating means in said adaptive averaging circuit receiving said range enabling pulse for gating said range gated video to said adaptive averaging circuit only during said range of interest such that the range gated filter characteristics are affected by clutter returns only in said range of interest.

3. The subject matter of claim 1 wherein said adaptive averaging circuit means further includes variable duty cycle switching means responsive to comparison of said range gated video with a reference potential to supply said control signal as variable duration pulses in accordance with said comparison to all said range gated filters,
each said range gated filter including impedance switching means responsive to said variable duration pulses to change the effective electrical impedance of a portion of a respective one of said range gated filters to thereby adjust a cut off frequency therein for altering the frequency bandwidth of such respective one of said range gated filters.

4. The subject matter of claim 3 wherein said variable duty cycle switching means repetitively supplies said variable duration pulses at a constant repetition rate with pulse duration being variable from zero duration to a constant DC level corresponding to a 100 percent duration of a variable duration pulse of a given pulse period between two successive ones of said variable duration pulses and said pulse repetitive rate being a much higher rate than any frequency of any signals to be processed through any of said range gated filters.

5. The subject matter of claim 4 wherein each of said range gated filters includes filter means having a cut off frequency corresponding to a given clutter rejection in a frequency domain, each said filter means including at least one cut off frequency determining element in said portion and exhibiting a given electrical impedance at said cut off frequency,
said impedance switching means in each said range gated filter means being electrically connected across said frequency determining element and responsive to said variable duration pulses to lower the effective electrical impedance of said frequency determining element to thereby alter said given cut off frequency.

6. The subject matter of claim 1 wherein said timing means further supplies a range enabling pulse having a timing and duration indicative of a range of interest,
said adaptive averaging circuit including first and second gating means responsive to said range enabling pulse to respectively pass said range gated video and said reference amplitude,
differential comparison means in said adaptive averaging circuit receiving said passed range gated video and reference amplitude and amplitude comparing same to supply a comparison signal,
integrating means in said adaptive averaging circuit receiving said comparison signal and averaging same during receipt of said range enabling pulse by said adaptive averaging circuit and holding said averaged comparison signal when said adaptive averaging circuit is not receiving said range enabling pulse,
a variable duty cycle pulse generator receiving said averaged comparison signal and being responsive thereto to generate pulses having a constant repetitive frequency much greater than a frequency of any signal to be processed by said range gated filters and varying pulse durations in accordance with the amplitude of said averaged comparison signal,
impedance switching means in each of said range gated filters and responsive to said constant frequency variable duration pulses to vary an effective electrical impedance thereof by switching between current conduction and nonconduction states to thereby adjust electrical characteristics of such range gated filters in accordance with said variable duration pulses, said adjustment of electrical characteristics comprising adjusting a cut off frequency such that the amplitude of said range gated video has a predetermined relation to said reference amplitude whereby clutter returns in said range gated video are held to a predetermined amplitude for optimizing clutter rejection.

7. A method of clutter rejection in a moving target detecting radar system including comparing the amplitude of processed radar return signals against a reference amplitude,
adjusting the lower cut off frequency of the radar system in accordance with such comparison such that a region for moving target detection is continually maximized in the frequency domain to such received clutter in such frequency domain by raising said lower cut off frequency when the processed radar return signal amplitudes exceed said referenced amplitude and lowering said lower cut off frequency when the amplitude of said processed radar return signals is less than said reference amplitude.

* * * * *